Jan. 26, 1932.   H. B. SHOEMAKER   1,843,070
DIFFERENTIAL OIL DIPPER
Filed May 30, 1930
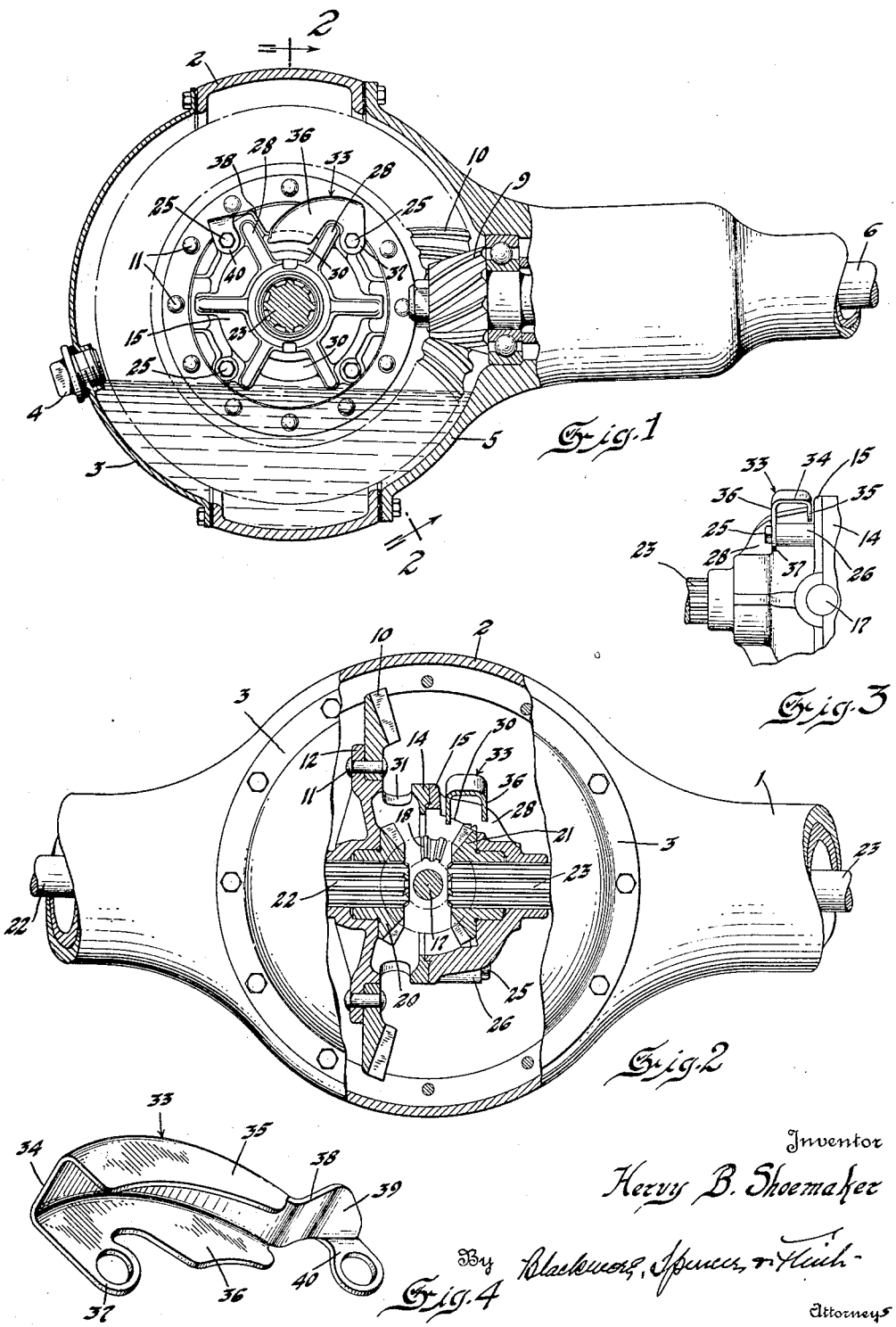
Inventor
Hervy B. Shoemaker
By Blackmore, Spencer & Hulse
Attorneys Patented Jan. 26, 1932

1,843,070

UNITED STATES PATENT OFFICE

HERVY B. SHOEMAKER, OF DETROIT, MICHIGAN, ASSIGNOR TO GENERAL MOTORS CORPORATION, OF DETROIT, MICHIGAN, A CORPORATION OF DELAWARE

DIFFERENTIAL OIL DIPPER

Application filed May 30, 1930. Serial No. 457,647.

In motor vehicles and the like, as usually constructed, the differential drive mechanism between the propeller shaft and drive axle is partly submerged in and moves through a supply of lubricating oil or grease contained in the axle housing. The normal level of lubricant is such that when the vehicle is driven at a very low speed and the movement of the differential mechanism is slow, all of the parts needing lubrication dip in the lubricating medium once each revolution of the differential gear casing and will thus be amply lubricated. At ordinary city driving speeds the lubricant is agitated and splashed about in the housing by the rotation therethrough of the differential, and the splash is relied upon to keep the parts properly lubricated. This lubrication of the parts will be thorough enough if the lubricant supply is maintained at or near the proper level, but the fact is that many car owners and operators neglect to regularly replenish the supply, and if for this or any other reason the level falls, it follows that there is less splash and then the parts failing to receive sufficient lubricant wear out quickly. Then too, when the vehicle is operated at high speed the assembly turns so fast that centrifugal force prevents the lubricant reaching in any quantity the central parts of the differential.

To overcome inadequacy of lubrication and prevent wear and noisy operation, the present invention contemplates the provision of a scoop or dipper for use with differential mechanism. For convenience and economy of manufacture, the dipper may take the form of a sheet metal stamping preferably secured to the conventional differential gear casing for rotation therewith, and extended from its leading edge or mouth that dips into the lubricant supply upon each rotation, to an opening in the wall of the casing so as to scoop up a part of the lubricant and direct or deflect it to the interior of the casing, and thereby insure the delivery of an abundance of lubricant to the differential gearing and bearings at all times, even though the supply is somewhat below normal and/or the speed of rotation high.

A better understanding of the invention may be had upon reference to its preferred embodiment illustrated in the accompanying drawings and hereinafter described in detail, although it will be obvious that the invention is not limited in its scope to the exact form and application shown and described and that it may be used in different connections and variously modified and altered to fit conditions.

In the drawings, Figure 1 is a cross-sectional view of a rear axle housing showing differential mechanism embodying the present subject matter. Figure 2 is a section taken on line 2—2 of Figure 1. Figure 3 is a fragmental elevation looking toward the mouth of the scoop, and Figure 4 is a detail perspective view of the scoop.

In the drawings the reference character 1 indicates a rear axle housing with a centrally enlarged proportion 2 that encloses the differential mechanism and provides a well or pocket for a supply of lubricant, in co-operation with a removable inspection or cover plate 3 on one side thereof that carries a filler plug 4, and a tubular member 5 on its opposite side that provides a bearing for the propeller shaft 6. Keyed on the rear end of the propeller shaft 6 is a driving gear or pinion 9 in mesh with a ring gear 10, secured as by rivets 11, to the peripheral flange 12 of the differential gear casing. This casing is shown as being formed in two halves or sections, 14 and 15, and carries in spaced relation on the pin or shaft 17, a pair of differential pinions, only one of which is indicated in the drawings at 18. These differential pinions engage with the differential gears 20 and 21 splined on the inner ends of the drive axle sections 22 and 23, respectively. All of this constitutes the conventional differential driving mechanism, the action and operation of which is well known.

In the present instance, the gear casing sections 14 and 15, are secured together by long bolts or studs 25, four of such bolts being shown in the drawings, each extending through an enlarged boss 26 on the section 15 and into screw threaded engagement with flange section 14. For reinforcement purposes it has been found desirable to form the section 15 with a number of radial webs as at 28, of which there are six in the construction illustrated. At diametrically opposite points the wall of the casing section 15 is cut away between a pair of adjacent webs 28, to afford openings 30, and similar openings 31 are also provided in the casing section 14, these openings being for the purpose of allowing lubricant, the normal level of which is indicated by the broken lines in Figure 1, to enter the interior of the casing and lubricate the differential gears as well as their bearings, and other associated parts.

To insure an adequate delivery of lubricant to the gears there is provided in addition to the entrance openings, one or more of the scoops or dippers 33, preferably formed as before stated by sheet metal stamping. As is shown in the drawings the stamping 33 is of substantially Z shape in longitudinal section, one of its legs being curved and of substantially channel shape in cross section, to afford a troughed deflector, that consists of an arcuate base 34 and a pair of side flanges 35 and 36. The outer flange 36 is cut away so as to clear the adjacent web 28 as clearly shown in Figure 1, and provides in effect an apertured attachment ear 37 to be positioned beneath one of the studs 25. The intermediate portion of the Z indicated by the numeral 38 extends radially outward alongside its adjacent web 28 to position the other leg 39 of the Z clear of the web. This leg 39 has a lateral or dependent ear 40 apertured for the passage there through of a connecting bolt 25. The stamping is thus secured to the casing by means of the connecting bolt 25, with the discharge end of the scoop positioned directly over one of the openings 30, the free end of the leg of the Z constituting the leading edge and providing a mouth from which the base 34 curves rearwardly and inwardly toward the overlaid opening 30.

It will be appreciated, therefore, that there is thus provided a scoop which can be manufactured at very low cost and then applied very readily to existing differential mechanisms, without requiring any change in such mechanisms. The particular shape of the stamping is such as to lend it a degree of inherent strength and to effectively direct lubricant to the differential gears as it repeatedly dips into the lubricant supply.

I claim:

1. In a drive axle for motor vehicles, a housing adapted to contain lubricant, a differential gear casing rotatable in the housing and provided at its sides with substantially radially extending reinforcement webs, with an opening between a pair of webs leading to the interior of the casing, and a sheet metal stamping of substantially Z shape, having one leg thereof positioned over the opening and provided with side flanges to form a scoop leading to the opening; one of said flanges being cut away to clear an adjacent web and providing an attachment ear, the intermediate portion of the Z extending outwardly to clear another web and the other leg of the Z projecting across the top of said last mentioned web and carrying an attachment ear, and means to fasten said ears to the casing to rigidly hold the stamping in place.

2. In a drive axle for motor vehicles, a housing adapted to contain lubricant, a differential gear casing rotatable thru the lubricant in said housing and having an opening in the side wall thereof, and a scoop comprising a sheet metal stamping, having a pair of attachment ears by which it is rigidly secured to the casing and a deflector portion positioned laterally of the casing wall and extended from its leading edge that dips into the lubricant to the opening in the casing wall so as to direct lubricant to the interior of the casing.

3. For use with the differential driving mechanism of a motor vehicle or the like, of the type wherein a differential gear carrier rotates thru a supply of lubricant, a deflector adapted to be carried by the carrier in its rotation thru the lubricant and to dip into the lubricant and direct a portion thereof to the differential gearing, comprising a sheet metal stamping having a pair of apertured attachment ears by which it may be rigidly secured to the carrier over an opening thru a wall to the interior thereof, and being of substantially channel section to provide a scoop leading to the opening with a forwardly directed mouth.

4. For use with the differential driving mechanism of a motor vehicle or the like, of the type wherein a differential gear carrier rotates thru a supply of lubricant, a deflector adapted to be carried by the carrier in its rotation thru the lubricant and to dip into the lubricant and direct a portion thereof to the differential gearing, comprising a sheet metal stamping of substantially Z shape in longitudinal section, with one leg of the Z having flanges along opposite sides thereof, one of which provides an attachment ear, and the other leg of the Z having a single flange at one side thereof to provide an attachment ear.

In testimony whereof I affix my signature.

HERVY B. SHOEMAKER.